United States Patent
Rosen et al.

[15] 3,654,980
[45] Apr. 11, 1972

[54] BEAD SEATER

[72] Inventors: Ian K. Rosen; William C. Holmgren, both of Muskegon, Mich.

[73] Assignee: AGSRAD, Inc., Muskegon, Mich.

[22] Filed: Jan. 26, 1970

[21] Appl. No.: 5,728

[52] U.S. Cl. ....................................................157/1.1
[51] Int. Cl. ...............................................B60c 25/12
[58] Field of Search.......................................157/1.1

[56] References Cited

UNITED STATES PATENTS

| | | | |
|---|---|---|---|
| 3,552,469 | 1/1971 | Corless | 157/1.1 |
| 2,954,079 | 9/1960 | Tarner | 157/1.1 |
| 3,081,816 | 3/1963 | Branick | 157/1.1 |

*Primary Examiner*—Granville Y. Custer, Jr.
*Attorney*—Miller, Morriss, Pappas & McLeod and William J. Morriss

[57] ABSTRACT

A bead extending resilient ring, one portion of which offers less resistance than the balance of the ring to provide a selected differential local resistance. An extruded resilient ring having a seam formed by abutting the two ends of an extruded cross section and wherein the portion at or adjacent the seam provides a differential resiliency whereby the extender gasket formed by the ring is guidably moved when radial and axial pressures are applied to the ring. Several cross sections and surface treatments are indicated which provide superior performance in controlling the movement of the extender and a dimple may be provided in the surface of the resilient ring to index the flow of the ring from between the wheel and tire and in avoidance of scuffing of the ring by the inflation valve base where scuffing is a problem.

3 Claims, 10 Drawing Figures

PATENTED APR 11 1972
3,654,980
SHEET 1 OF 3
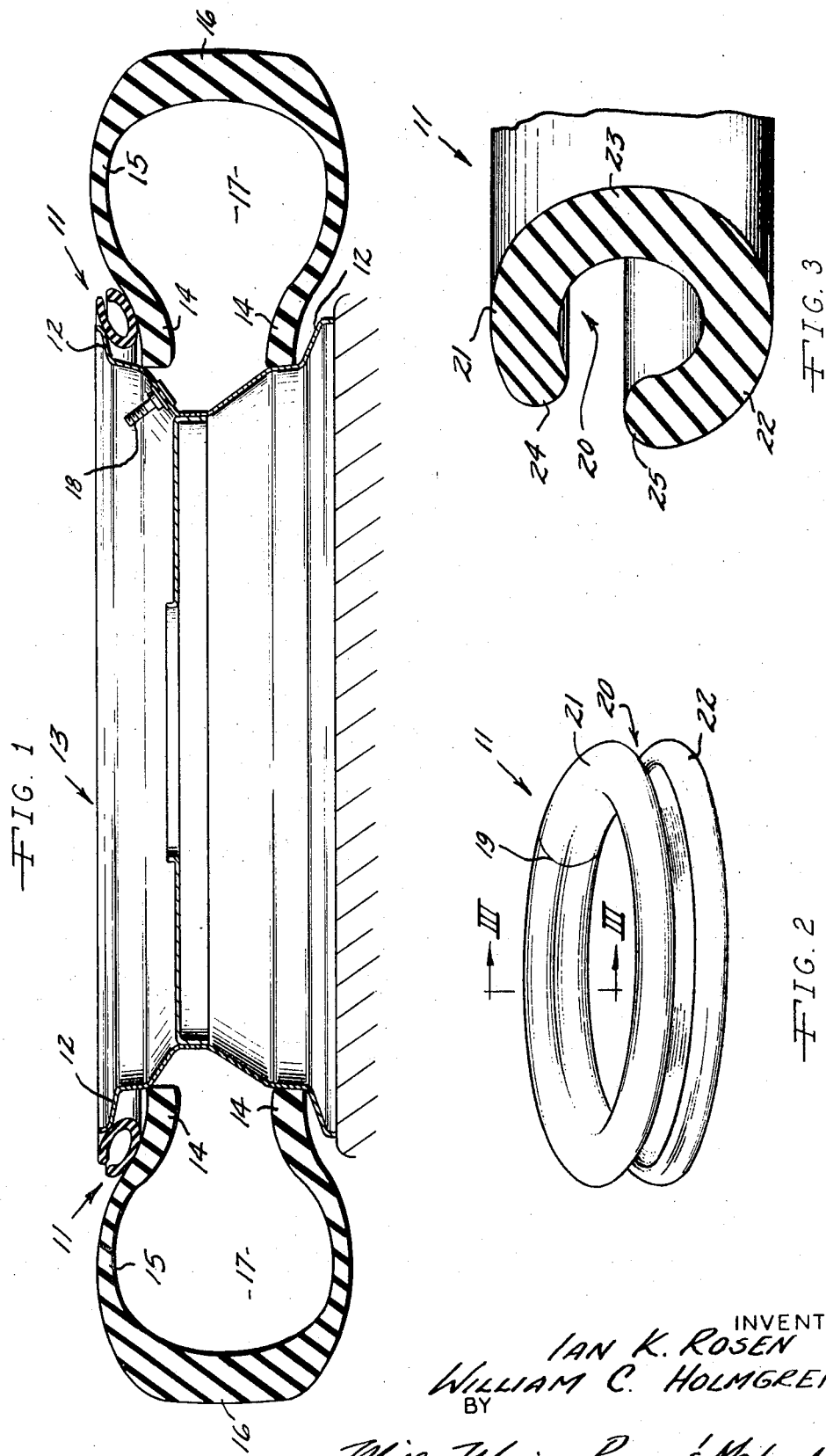
INVENTORS
IAN K. ROSEN
WILLIAM C. HOLMGREN
BY
Miller Morris Pappas & McLeod
ATTORNEYS

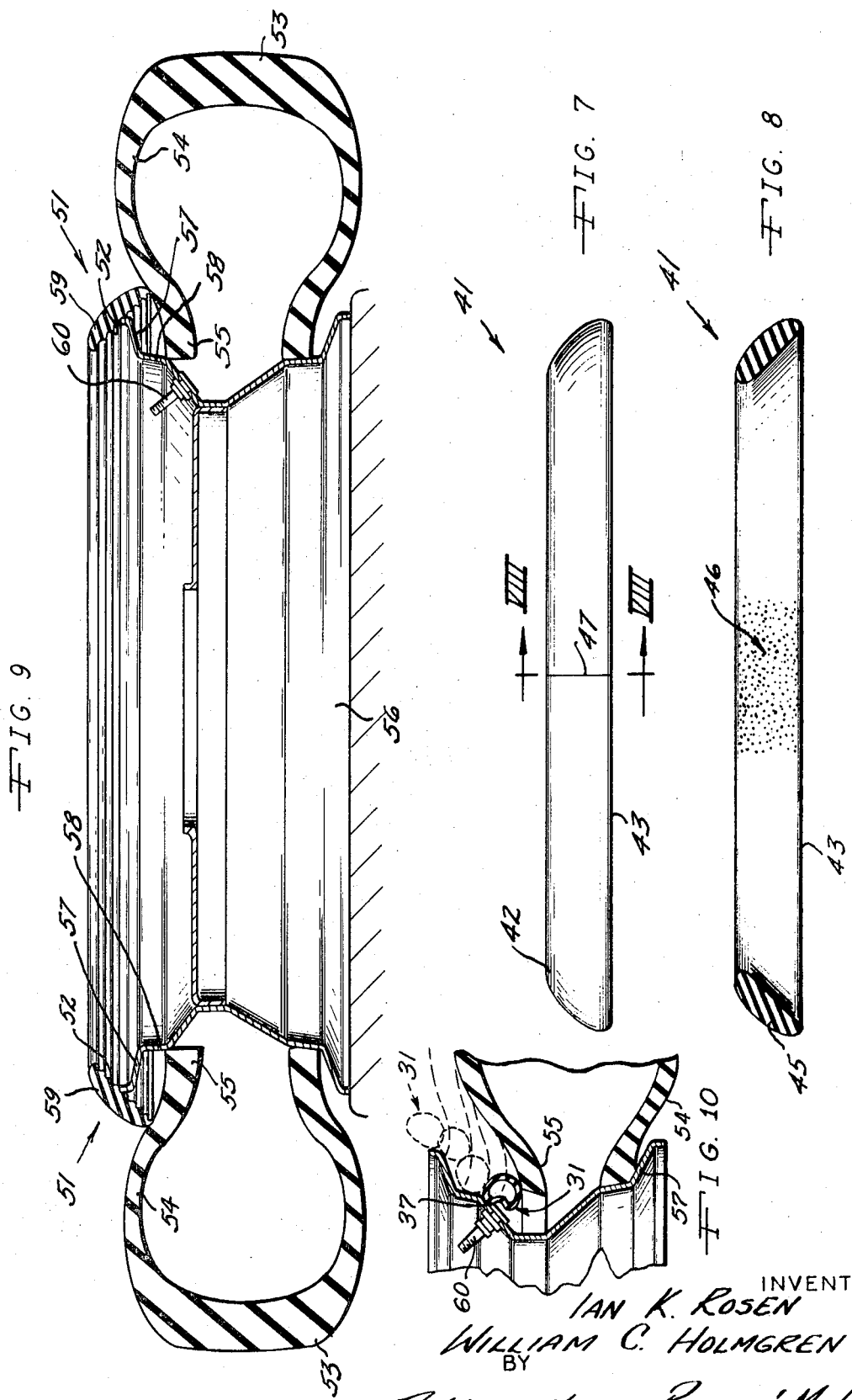

BEAD SEATER

The present invention relates to a bead seating resilient ring and more particularly to an improved resilient ring useful for the inflation of tubeless tires. The resilient rings are interposed between the bead flange of the rim and the bead or side wall of the tire adjacent the bead to provide a temporary seal until such time as the bead of the tire is expanded to contact with the bead flange of the rim. Then the seal ring is squeezed out of its position and over the rim flange.

The prior art as known is represented by the U.S. Pat. No. 2,874,759 to E. G. Ranallo and U.S. Pat. No. 2,874,761 to A. V. Vavaro. Since that work the gasket structures have been cast or formed in vented hollow or sponge forms which were occasionally trapped between rim and bead. None of the devices as previously known have been extruded and advantages are obtained by extruding the devices beyond mere economy. For example, the butt ends of the extruded resilient rings are sealed as by a mastic which causes a local variance in rigidity of the consequent ring and this variation in resiliency allows a controlled resistance or directionalized slippage of the ring device from between rim and tire which relatively eliminates the "pop-off" of the ring and makes the movement of the ring predictable as the tire is inflated. This same controlled release concept can be obtained with differential surface treatments with differential friction.

Accordingly, the principal advantage of the present invention is to provide an extruded resilient bead extender. Another object is to provide a bead extender which is predictable in its performance. Still another object is to teach an improved construction for resilient rings which includes clearance provisions for valve protuberances. Other objects including simplicity and rugged dependability in service will be increasingly appreciated by those skilled in the art as the description proceeds.

GENERAL DESCRIPTION

In general, the bead expanders of the present invention are extrusions as contrasted to molded, cast, or pressed forms as previously known in which a seam runs continuously around the ring. The resultant resilient ring of the present invention is thus extruded continuously, is cut off at suitable intervals and the two ends are then joined in a seam by means of a mastic or by vulcanization and may or may not include a reinforcing insert backing up the seam. The result, aside from economy in fabrication, is a local area in the resilient ring having a different resistance to deformation or surface friction than the balance of the ring. This allows the ring to be so positioned as between tire and rim that the differential resistance to deformation will guide the movement of the ring as it is squeezed out from between the rim and tire on inflation. The unit may be closed with air, liquid, or gas trapped in the hollow portion. The harder or less resilient spot at the seam is eased out of the sandwich between rim and tire at a different pressure and time than the balance of the ring oozes out. This difference in release of the unit prevents 1"pop-off" and prevents sealing of the unit in with the bead.

Several forms of the present invention are available besides the popular hollow, tubular form with air, liquid, or gas in the hollow. The C shaped gasket ring cross section extends the bridging character of the ring and allows the ring to collapse on itself in avoidance of venting or porting. An internal wedge form of resilient extruded ring is also available and may include steps or serrations, or corrugations in concentric stepped relation for enhancing the progressive seal as the tire expands toward the rim flange.

A dimple or indentation is provided which is registrably located in respect to the inflating valve protuberance so that the resilient extruded rings of the present invention are not damaged in use by scuffing the valve extension.

In operation a tubeless tire is placed loosely on a rim so that one sidewall at the bead is properly seated on the rim flange. The other sidewall of the tire (usually the upper) sags out of contact with its corresponding flange. The resilient ring or gasket of the present invention is inserted over the rim flange and into contact with the tire on one side and contacts the wheel rim on the other side. These interphases of gasket, rim and tire are preferably coated with a lubricant compound which allows the flowing movement of rubber to occur in relation to the metal rim flange without damage to the rubber and in accomplishment of a flow-like guiding of the bead to proper seating on the rim flange. This squeezes the gasket or extender out of the gap between rim and tire and normally the more rigid seam part of the resilient ring slides out first under the radial and axial loading. The softer more resilient portions of the ring follow. This design avoids "pop-off" frequently observed in prior art devices where the release of the ring was sudden and at all points on the rim periphery. This "pop-off" frequently placed operations and personnel in danger as the gasket flew free of the rim. In some circular prior art sponge units and units having air exhaust valves, the unit tended to collapse or to get pinched thereby tending to get sealed into the tire. Our invention avoids such "pinching" because in the closed forms with air, liquid, or gas in the hollow, the compression of the unit forces the unit to release itself away from the tire rather than "pinch-in." In addition, as will be appreciated, the extender of the present invention is sufficiently resilient to bridge several rim sizes thereby minimizing the number of extender units required in a tire installation garage since it can be used with various tire and rim sizes. The resilient rings of the present invention are extruded from rubber or rubber-like resin material such as neoprene or the like.

IN THE DRAWINGS

FIG. 1 is a schematic elevational full section view taken through a typical automobile wheel on which is to be mounted a tubeless tire, and a bead extender in accord with the present invention is interposed between the uppermost flange of the wheel and the bead or shoulder of the tire. As the tire is inflated the extender maintains a seal and is pushed upward and radially outward as the tire bead seats itself against the rim flange.

FIG. 2 is a perspective view of the bead extender shown in FIG. 1 but separated from its use position between the flange and flank of the tire and shows the butt seam joint which provides the means for providing differential resistance to displacement.

FIG. 3 is a section elevation view taken on the III—III of FIG. 2 and illustrates the regular C cross section of the bead extender as shown in FIGS. 1, 2 and 3 and allowing the unit lips to curl against each other under inflating pressures.

FIG. 7 is a modified version of the bead extender of the present invention shown in an elevation view at the butt-joint thereof and showing surface treatment as a means to achieve differential resistance.

FIG. 8 is a section view of the structure shown in FIG. 7 and taken on the line VIII—VIII thereof.

FIG. 9 is a somewhat schematic cross section view taken through a wheel and tubeless tire and indicating the relative bridging or gasket relationship between tire and wheel flange as accomplished by the bead extender as shown in FIG. 7 and slightly modified therefrom to indicate the circumferential serrations or steps therein.

FIG. 10 is a fragmental cross section radially through a portion of tire and rim and showing a bead extender progressing from seal relation to ejection during inflation.

SPECIFIC DESCRIPTION

Figure 4:
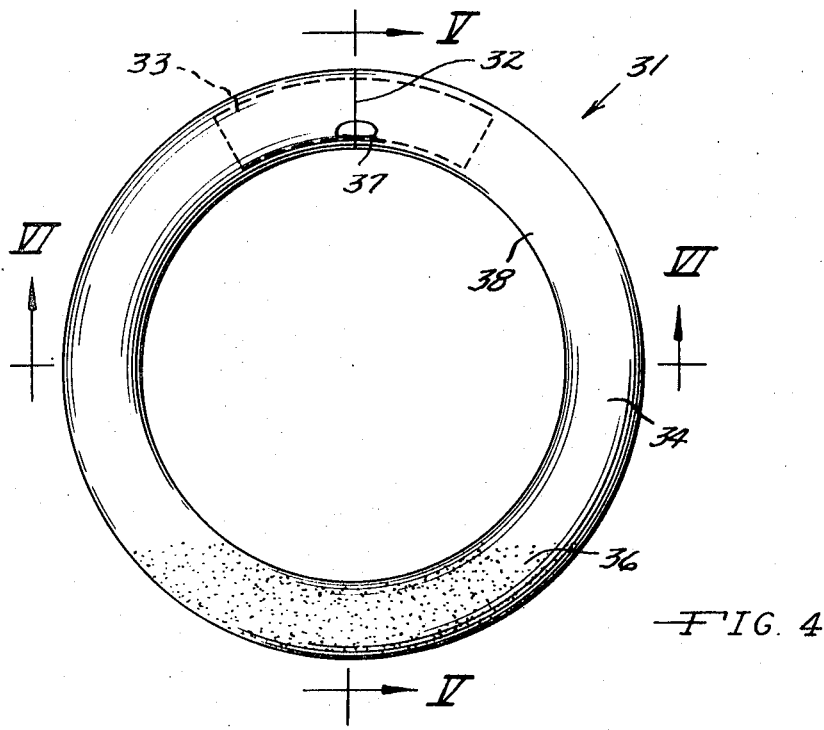
FIG. 4 is a plan view of another modification of the bead extender of the present invention and indicating the butt-seam and scuff avoiding dimple; and a tubular reinforcing element insert at the seam.

Referring to the drawings and with particularily to the FIG. 1 thereof an extender embodiment 11 is illustrated in its operative setting interposed between a wheel rim flange 12 of the wheel 13 and the bead 14 and sidewall 15 of the tire 16. The tire 16 is expanded upon inflation and thus the beads 14 are shifted so that both beads 14 of the tubeless tire 16 are between the rim flanges 12 of the wheel 13 and seated thereagainst. When the wheel 13 is positioned horizontally, as shown, and the tire 16 is placed between the rim flanges 12 then one of the circumferential beads 14 engages the lowermost flange 12 but the uppermost flange 12 is not usually touched by the uppermost bead 14 of the tire 16 and if it does in fact touch the flange 12 it is not in a seal relationship. Accordingly, in the uninflated condition the upper bead 14 and sidewall 15 sags away from the upper rim flange 12. A seal is accomplished by the gasket extender 11 which is insertable between rim 12 and tire 16 so that when inflating pressure is injected into the cavity 17 through valve 18, the side wall 15 and bead 14 presses upward against the extender 11 crushing and expanding the extender or bead seater 11 until a seal is accomplished as between bead 14 and rim 12. This collapses the extender 11 as seen and as the bead 14 seats into the base of the flange 12 the upward and radial force from the inflating tire 16 urges the extender 11 off of the rim 12. The extender or bead seating gasket 11 is extruded from rubber or rubber-like material in a C-cross section configuration. The C-portion opens on the outer periphery thereof when the ends of the extrusion are joined to form a resilient ring as shown. In FIG. 2 the mastic sealed butt joint 19 is shown and the outwardly facing channel or groove 20 is also plainly seen. As will be appreciated the groove 20 is relatively wide spaced until the pressure on the side walls 21 and 22 of the extender 11 from the inflating tire 16 on one side and rim flange 12 on the other side collapses the walls 21 and 22 toward each other. The butt joint 19 provides a differential resistance reflected in a more rigid section at the joint 19 than in the balance of the device. This causes a selected motion of the joint 19 ahead of the balance of the ring or extender 11 as the inflating force is applied. This avoids jamming of the ring 11 in between the rim 12 and bead 14 or allowing the ring 11 to be lost inside the tire 16. In addition, the flexure characteristics of the form of extender 11 shown in FIGS. 1–3 allows the ring or extender 11 to be sized for expansion to use on two or more sizes of wheel 13.

The cross section of the extender 11 in FIG. 3 allows the inner wall 23 to flex outwardly to accomodate plural wheel sizes and the lips 24 and 25 roll, one into the other, on application of radial and compressive (up and down) forces.

The material of the extender 11 is rubber or rubber-like resin and preferred use is accompanied by the application of suitable lubricants as between extender 11 and rim flange 12 or wheel 13. As will be appreciated as the description proceeds the described structure may also include selective use of a depression on the internal surface of the ring 11 to avoid scruffing damage by contact with the inner slim protuberance of valve 18. Further, the indexing movement of the ring or extender 11 can be materially improved by selected surface upsets on the flanks 21 and 22 providing a frictional resistance as desired in control of the movement of the ring 11.

Figure 5:
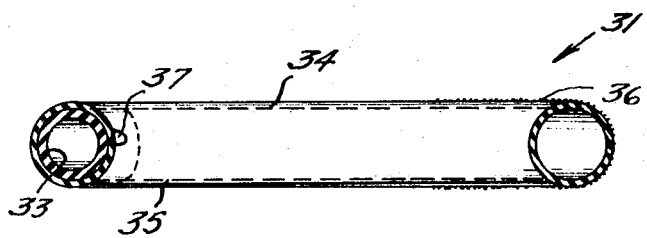
FIG. 5 is a section elevation view taken on the line V—V of FIG. 4 and indicating the tubular insert in position at the butt joint.
Figure 6:
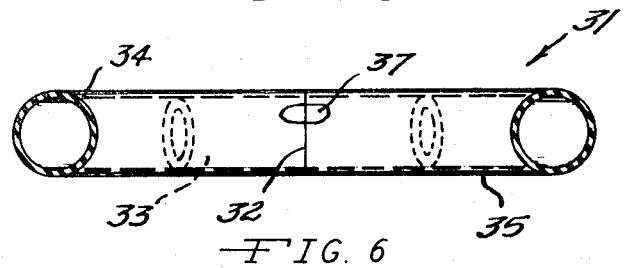
FIG. 6 is a section elevation view of the device of FIG. 4 taken on the line VI—VI of the FIG. 4.

By reference to FIGS. 4–6 inclusive an extender 31 in the form of an extruded tube joined at the ends in a butt seam 32 forms a gasket ring useable as seen in the FIG. 1 as between a bead 14 and rim flange 12 to hold a sufficient seal to allow expansion of the tire 16 until ultimate proper seating of the beads 14 on the wheel 13 and in contact with the flanges 12.

In the tubular form, as shown, a tubular reinforcement insert 33 is located bridging the line of the joint 32 and extends on both sides to reinforce and to stiffen or rigidify the locality adjacent the butt joint 32. Opposite the joint 32, on the other side of the ring 31, the upper 34 and lower 35 surfaces of the extender 31 may be upset as by abrading, etching, or embossing 36 for the provision of a selected frictional surface to provide a selected drag complementing the oozing directional control described in the joint 32. The upsets 36 are best appreciated by reference to FIG. 5. In FIGS. 4, 5, and 6 it will also be noticed that a dimple or depression 37 is provided on the inner upper surface 38 of the tubular ring 31 in alignment with the seam or joint 32. The dimple 37 serves as an indicator of the direction that the extender 31 will take as it is squeezed out from between rim flange and tire bead and also the dimple 37 can be oriented with the valve to avoid scuffing of the extension of the stem on the interior of the rim. The extender 31 is unvented and the entrapped gas results in equal internal pressure distributer.

FIGS. 7, and 8 are directed to a modified bead extender 41 which is a conic form of annulus formed in resilient rubber-like material. In FIG. 7 the outside is seen as a rounded truncated conic section, the upper edge 41 being engageable with the rim flange on the inside surface 42 as best seen in the section view of FIG. 8 and the lower edge 43 is placed in contact with the sidewall of a tire. The body portion 45, intermediate the edges, bridges the gap between tire and flange when the tire is uninflated. As in the previously described extenders the element 41 performs the function of a gasket allowing the tire to be inflated. The butt joint 47 joins the ends of the extruded material forming the annular seal 41. Selected treatment of the surfaces at 46 provides enough differential friction to control the direction of travel of the extender 41. Such an upset may include abrasion and other mechanical and/or chemical upset.

The use of devices as seen in FIGS. 7 and 8 are best appreciated by reference to FIG. 9 in which an extender 51 having internal striae 52 is shown, but otherwise conforming to the annular construction of the extenders 41. The sidewalls 54 move toward the plane of the rim flange 57 and the bead 55 travels toward its seat on the rim flange. This presses the bead extended ring 51 upward over the flange and eventually free of the rim. In FIG. 9 the tire 53 having upper sidewall 54 and corresponding bead 55 is seen on the rim 56 as it is expanding toward its ultimate seat position against the flange 57 on the seat shoulder 58. The serrations or striae 52 are annularly and step wise incised in the inner face of the body 59 of the extender ring 51. The rubber-like material of the extender 51 allows the body 51 to ease itself upward off of the rim 57. The serrations 52 provide a controlled sealing which is progressive as the extender ring is moved by the expanding tire 53 and the taper of the ring 51 (larger diameter at bottom edge) actually progressively reduces the grip of the extender ring 51 on the flange 57 as the tire 53 is expanded. This truncated form of bead extenders 41 and 51 assures the tightest seal on the flange 57 at the outset while inflation is occuring as through valve 60. In control of the flow of the extenders 41 or 51 it will be appreciated that these structures are formed by extrusion and the ends thereof are secured together as in the seam 47 best seen in FIG. 7 which provides a differential hardness or resiliency at that point and which tends to guide the movement of the extender rings. The truncated form of extenders 41 and 51 allow maximum extension to accommodate various tire and wheel sizes.

The FIG. 10 assists in visualizing that the bead extender of the present invention is placed between tire bead 55 and rim 57 inside the rim 57 and immediately in contact with the tire bead 55 as it lies limp below its ultimate seat location. The form of the bead extender 31 is the dimpled form and the dimple 37 is shown at the valve 60 so that as motion occurs in the extender 31 (as shown in phantom line) the surface of the extender 31 avoids scuffing contact with the base of the valve. This is useful for locating and in some instances avoids blockage of the valve 60. From the FIG. 10 the expansion of the tire 54 is also shown in phantom line.

Having thus described our invention and several specific modifications thereof others skilled in the art will appreciate the contribution and may modify, improve, or vary the structures herein, and such modifications, improvements, and variations are intended to be included herein limited only by the scope of the hereinafter appended claims.

We claim:
1. A bead extending gasket interposable between a tire rim and the bead of a tubeless tire comprising:
   an annulus of resilient material having a uniform extruded cross section configuration and having ends in butted seam relationship at one point in said annulus, said seam providing a local differential zone of decreased resiliency which zone of differential resiliency guidably controls the local expansion of said annulus and as a result the direction of movement of said annulus.
2. A bead extending gasket bridging the gap between rim and tire bead comprising:
   a resilient extruded ring joined in a butt joint;
   a seam at said butt joining having a differential resistance to deformation as related to the balance of said ring; and
   a depression in the surface of said ring, registrable relative to a valve stem extension in said rim whereby scuff of said ring is avoided as inflation expands said tire bead toward said rim and radially displaces said ring.
3. A bead extending gasket bridging the gap between rim and tire comprising:
   an extruded resilient tubular ring having a regular cross section;
   a butt joint connecting the ends of said extrusion to form said ring;
   means at said butt joint locally altering the rigidity of said ring;
   and said ring at the side opposite to said joint including surface sealing upsets engageable with said rim and said tire bead.

* * * * *